United States Patent [19]
Ledon

[11] Patent Number: 5,902,559
[45] Date of Patent: May 11, 1999

[54] PLANT FOR THE PRODUCTION OF HYDROGEN PEROXIDE

[75] Inventor: Henry Ledon, Versailles, France

[73] Assignee: Chemoxal SA, Paris Cedex, France

[21] Appl. No.: 08/894,138

[22] PCT Filed: Feb. 14, 1996

[86] PCT No.: PCT/FR96/00245

§ 371 Date: Aug. 13, 1997

§ 102(e) Date: Aug. 13, 1997

[87] PCT Pub. No.: WO96/26898

PCT Pub. Date: Sep. 6, 1996

[30] Foreign Application Priority Data

Feb. 28, 1995 [FR] France .................................. 95 02317

[51] Int. Cl.⁶ ...................................................... B01J 8/02
[52] U.S. Cl. .......................... 422/211; 422/234; 422/235; 422/188; 422/189; 422/190
[58] Field of Search .................... 423/584, 588; 422/190, 211, 234, 235, 188, 189

[56] References Cited

U.S. PATENT DOCUMENTS

| | | | |
|---|---|---|---|
| 2,902,347 | 9/1959 | Cosby et al. | 423/590 |
| 4,539,196 | 9/1985 | Sethi et al. | 423/588 |
| 5,302,367 | 4/1994 | Signorini et al. | 423/588 |

FOREIGN PATENT DOCUMENTS 10527  11/1989  WIPO.

OTHER PUBLICATIONS

"A New Process for Hydrogen Peroxide", *The Industrial Chemist*, vol. 35, Jan. 1959, pp. 9–17.

Primary Examiner—Hien Tran
Assistant Examiner—James C. Kennedy
Attorney, Agent, or Firm—Young &Thompson

[57] ABSTRACT

A plant for producing hydrogen peroxide by autooxidation of an anthraquinone derivative, including a catalytic hydrogenation vessel (1) supplied with hydrogen; an oxidizing vessel (2) supplied with an oxygen-containing fluid, particularly air; an extractor (3) supplied with water; and elements (7,16,19) for successively feeding a working solution containing at least one anthraquinone derivative dissolved in at least one organic solvent through the hydrogenation vessel (1), the oxidizing vessel (2) and the extractor (3), then recirculating it to the hydrogenation vessel (1). Elements (9,26) are provided for diverting at least part of the working solution from the extractor (3) to the oxidizing vessel (2) so that it bypasses the hydrogenation vessel (1). The plant is useful for producing hydrogen peroxide in situ in a paper pulp bleaching plant.

12 Claims, 2 Drawing Sheets

PLANT FOR THE PRODUCTION OF HYDROGEN PEROXIDE

FIELD OF THE INVENTION

The present invention relates to a plant for the production of hydrogen peroxide using the technique of autooxidation of an anthraquinone derivative, of the type including a catalytic hydrogenator fed with hydrogen, an oxidizer fed with a fluid containing oxygen, especially air, an extractor fed with water, and means for passing a working solution containing at least one anthraquinone derivative in solution in at least one organic solvent successively into the hydrogenator, into the oxidizer and into the extractor, and then recycling it to the hydrogenator.

The pressures given in what follows are relative pressures (or overpressures).

BACKGROUND OF THE INVENTION

A plant as described above is conventionally used for the production of commercial solutions of hydrogen peroxide. An example of such a plant is presented in the work by Kirk Othmer, "Encyclopedia of Chemical Technology", 3rd edition, volume 17.

For economic reasons (cf. Process Economic Report No. 68B, Hydrogen Peroxide, March 1992, chapter VI, SRI international) which are essentially linked with the costs of transportation and storage, these solutions must have a hydrogen peroxide concentration that is as high as possible, that is a concentration higher than 35%, more generally a concentration of 60% or 70% by weight.

To prepare these concentrated commercial hydrogen peroxide solutions, the process is run so as to recover at the outlet of the extractor a solution which has a hydrogen peroxide concentration that is as high as possible, while remaining outside the region of explosiveness of the mixtures of working solutions/aqueous solutions of hydrogen peroxide. In this respect, Patent Application FR-A-2,228,717 points out that the hydrogen peroxide concentration of said aqueous solution leaving the extractor must not be higher than 600 g/l, that is 50% by weight of hydrogen peroxide. A hydrogen peroxide concentration higher than this value is described as being capable of producing explosive reactions.

To obtain highly concentrated aqueous solutions of hydrogen peroxide, the operating parameters of the abovementioned autooxidation plant are adapted so as to permit the use of a working solution which has, throughout the plant, a hydrogen peroxide equivalent which is as high as possible, for example a hydrogen peroxide equivalent higher than 11 g/l, or even higher. Thus, Patent Application FR-A-2,086,166 recommends the use of a working solution capable of producing, after oxidation, a quantity of the order of 16 g of hydrogen peroxide per liter of working solution. The hydrogen peroxide equivalent is thus at least 16 g/l at the entry of the oxidizer. However, conventional plants using a high hydrogen peroxide equivalent present numerous disadvantages. Thus, they generally require the use of high oxidation temperatures. These temperatures become necessary to prevent the crystallization of the working solution which has a high hydrogen peroxide equivalent. In this respect reference may be made to "Techniques de l'Ingénieur", chapter "Peroxyde d'hydrogène", J. 6020, which mentions that the oxidation temperatures must be between 60 and 80° C.

Another disadvantage encountered in these plants is that the working solution decomposes rapidly.

In addition, these traditional plants are very sensitive to the presence of water, even in a small quantity, which can be introduced accidentally either into the oxidizer or into the conduits linking the oxidizer and the extractor. In this region the water reacts with the oxidized working solution, which can give rise to explosive reactions.

In addition, in order to reduce the risk of explosion in the oxidizer, it is necessary to employ "dumped" random packings (for example Raschig rings). These packings have good characteristics insofar as the gas-liquid contacts are concerned, but they are costly to use and take up a lot of room in the oxidizer. Furthermore, these packings have a tendency to retain solid impurities. Thus, when being started up again, the plant is exposed to a high risk of a relatively large quantity of impurities, especially metallic ones, suddenly entering the extractor, and this is dangerous in this part of the plant.

The objective of the present invention is to circumvent the abovementioned disadvantages.

More particularly, the objective of the invention is to provide a plant for the production of hydrogen peroxide using the autooxidation technique, which is particularly well suited from the viewpoint of capital cost, operating costs and safety in the actual industrial conditions. In particular, the objective of the invention is to provide a plant that enables hydrogen peroxide to be produced directly on the site where it is used by certain plants, such as plants for the manufacture of paper pulp.

SUMMARY OF THE INVENTION

To this end, the subject-matter of the invention is a plant for the production of hydrogen peroxide using the technique of autooxidation of an anthraquinone derivative, of the above-mentioned type, characterized in that means are provided for diluting the working solution originating from the hydrogenator.

In accordance with specific embodiments, this plant may comprise one or more of the following characteristics:

- the means of dilution comprise means for bypassing to the oxidizer a portion of the working solution originating from the extractor without its passing through the hydrogenator;
- the means for bypassing are adapted for bypassing to the oxidizer between 15 and 45% by volume of the working solution originating from the extractor;
- the means for bypassing are adapted for bypassing to the oxidizer one third by volume of the working solution originating from the extractor;
- the hydrogenator is adapted for producing at the outlet a working solution with a hydrogen peroxide equivalent of between 8 and 15;
- the hydrogen peroxide equivalent at the outlet of the hydrogenator is between 9 and 12;
- means are provided for mixing the reduced working solution originating from the hydrogenator and the oxidized working solution originating directly from the extractor, as are means for directing the mixture thus obtained to the oxidizer;
- the means for bypassing and the means for mixing are adapted so as to obtain at the entry of the oxidizer a working solution which has a hydrogen peroxide equivalent of between 7 and 9;
- the means for bypassing comprise a bypass conduit placed between a conduit for recycling the oxidized working solution, which links an outlet of the extractor to an entry of the hydrogenator, and a conduit for feeding the oxidizer with working solution, which links an outlet of the hydrogenator to an entry of the oxidizer;

a heat exchanger is provided between the conduit for recycling the oxidized working solution and the conduit for feeding the oxidizer with working solution and said bypass conduit is linked to the recycling conduit upstream of the exchanger and to the feed conduit downstream of the exchanger;

the oxidizer includes an enclosure containing means for gas-liquid contact, consisting at least partly of simple perforated trays or of trays similar to distillation trays, or else of an organized packing, especially an intersecting corrugated packing.

BRIEF DESCRIPTION OF THE DRAWINGS

The invention will be understood better on reading the description which is to follow, given solely by way of example and made with reference to the attached drawings, in which.

DETAIL DESCRIPTION OF THE INVENTION

Figure 1:
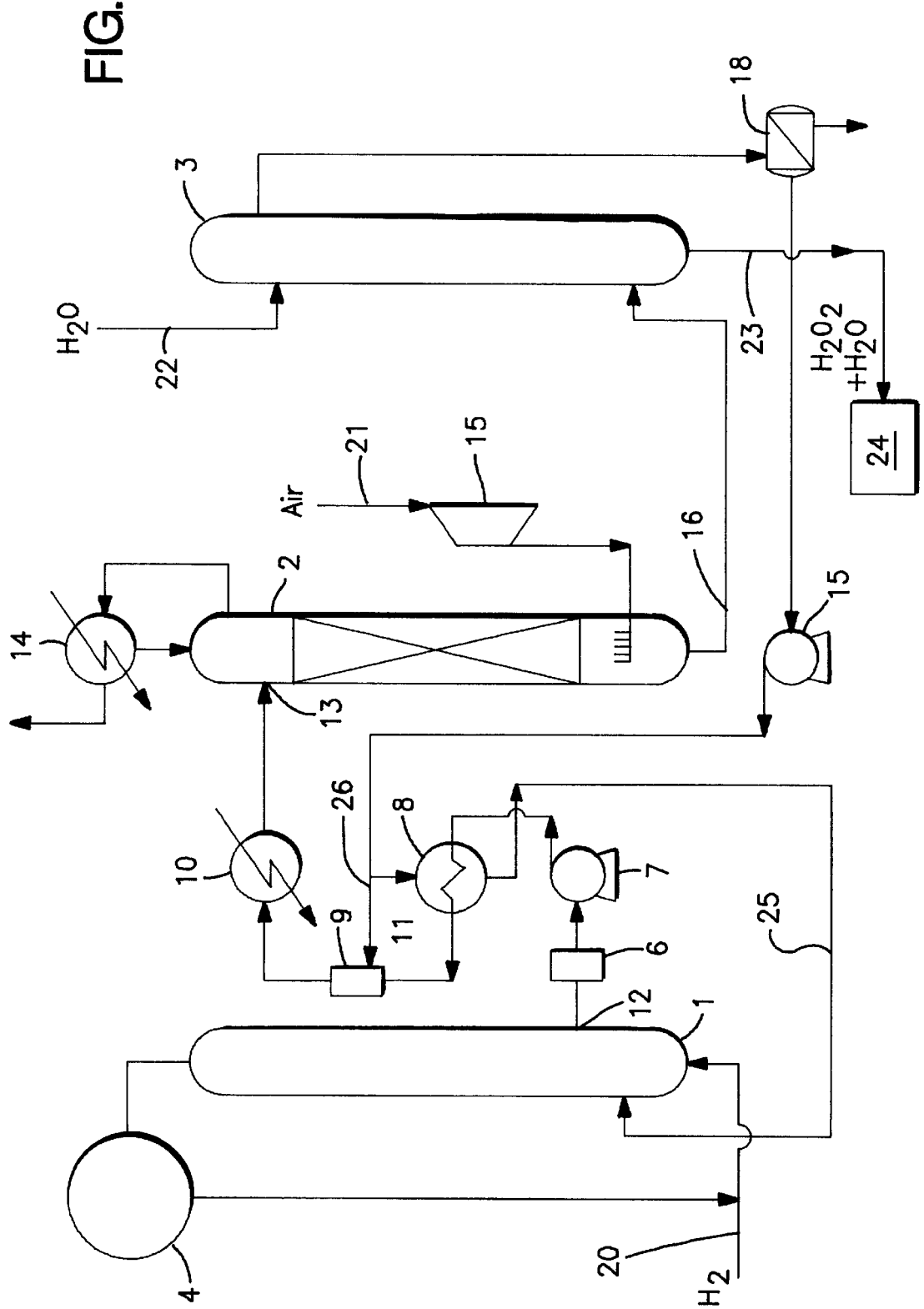
FIG. 1 shows diagrammatically a plant for the production of hydrogen peroxide in accordance with the invention.

The plant shown in FIG. 1 includes three main units of equipment in the form of columns: a catalytic hydrogenator 1, a countercurrent oxidizer 2 and a water extractor 3. It also comprises numerous items of equipment associated with these three units, only some of which have been shown. Thus, a booster-condenser unit 4 for recirculating the gaseous mixture containing hydrogen is associated with the hydrogenator. A filter 6, a pump 7, a heat exchanger 8, a mixer 9 and a water condenser 10 are connected in series in a conduit 11 for feeding the oxidizer 2 with working solution, linking an outlet 12 of the hydrogenator 1 to an upper entry 13 of the oxidizer 2. The plant additionally comprises a head condenser 14 and an air compressor 15 which are associated with the oxidizer, a conduit 16, which is as short as possible, linking the base of the oxidizer 2 to that of the extractor 3, and a coalescer 18 and a pump 19 for recycling the working solution.

Also shown in FIG. 1 is a conduit 20 for feeding the hydrogenator with makeup hydrogen, a conduit 21 for feeding air to the compressor 15, a conduit 22 for feeding the extractor 3 with demineralized water, a conduit 23 for hydrogen peroxide output, which leaves from the base of the extractor 3 and ends in a plant 24 which consumes hydrogen peroxide at the same concentration, and a conduit 25 for recycling the working solution, carrying the pump 19 and connecting an outlet of the coalescer 18 to the base of the hydrogenator 1, passing through the heat exchanger 8.

A bypass conduit 26 is provided between the recycling conduit 25 and the mixer 9. It is fitted upstream of the exchanger 8 in the recycling conduit 25.

The plant 24, which is to be found on the same site as the plant for the production of hydrogen peroxide, may be especially a plant for bleaching paper pulp.

The plant for the production of hydrogen peroxide includes numerous other items of equipment which are well known in the art and are not shown, such as means for regenerating decomposed products of the working solution, for introducing the catalyst, for solvent recovery, and the like.

In operation, a portion of the oxidized working solution consisting of at least one anthraquinone derivative and of at least one organic solvent is introduced at the base of the hydrogenator 1 via the recycling conduit 25 connected to the delivery of the pump 19, and a gas stream containing hydrogen is also introduced at the base of the hydrogenator. This gas stream consists, on the one hand, of the gas stream drawn off at the top of the hydrogenator and recirculated by the booster-condenser unit 4 and, on the other hand, of makeup hydrogen delivered via the conduit 20.

This portion of the oxidized working solution is thus partially reduced. The reduced solution, drawn from the base of the hydrogenator by the pump 7 via the filter 6, therefore contains hydroquinone derivatives (for example 80% of tetrahydroanthrahydroquinone and 20% of anthrahydroquinone).

The anthraquinone derivative constituent of the working solution is preferably chosen from 2-alkyl-9,10-anthraquinones in which the alkyl substituent contains from 1 to 5 carbon atoms, such as the methyl, ethyl, sec-butyl, tert-butyl, tert-amyl or isoamyl derivatives and the corresponding 5,6,7,8-tetrahydro derivatives, or from dialkyl-9,10-anthraquinones in which the alkyl substituents, which are identical or different, contain from 1 to 5 carbon atoms, such as the methyl, ethyl, tert-butyl radicals, for example 1,3-dimethyl, 1,4-dimethyl, 2,3-dimethyl, 2,7-dimethyl, 1,3-diethyl, 2,7-di-tert-butyl, 2-ethyl-6-tert-butyl and the corresponding 5,6,7,8-tetrahydro derivatives. The organic solvent constituent of the working solution is preferably a mixture of a nonpolar compound and of a polar compound. The nonpolar compound is preferably chosen from petroleum cuts with a boiling point higher than 140° C. containing predominantly aromatic hydrocarbons containing at least 9 carbon atoms, such as trimethylbenzene isomers, tetramethylbenzene isomers, tert-butylbenzene, methylnaphthalene isomers and dimethylnaphthalene isomers. The polar compound is preferably chosen from saturated alcohols preferably containing from 7 to 11 carbon atoms, such as diisobutylcarbinol, 3,5,5-trimethylhexanol, isoheptanol, carboxylic acid esters such as the methylcyclohexyl acetate marketed under the name "Sextate", heptyl acetate, butyl benzoate, ethyl heptanoate, phosphoric acid esters such as tributyl phosphate, tri(2-ethylbutyl) phosphate, tri(2-ethylhexyl) phosphate and tri(n-octyl)phosphate, and tetrasubstituted ureas such as tetra-n-butylurea.

A "hydrogen peroxide equivalent" is intended to mean the quantity of hydrogen peroxide, expressed in grams, which one liter of working solution is capable of supplying at the outlet of the oxidizer if the yield of this stage is 100%. This potential mass concentration of peroxide corresponds to a molar concentration which is equal to the molar concentration of all the reoxidizable anthrahydroquinone forms in the working solution. It depends, on the one hand, on the concentration of anthraquinone forms in the working solution at the beginning and, on the other hand, on the hydrogenation conditions in the hydrogenator 1, and on the optional dilutions of the reduced working solution.

In the present case the hydrogenation is performed at a temperature of between 50 and 70° C., with a pressure in the gas headspace of the hydrogenator (pressure which controls the hydrogen flow rate) approximately of 0.8 to 1.5 bar, and the hydrogen peroxide equivalent at the outlet 12 of the hydrogenator 1 is adjusted to a value of approximately between 8 and 15 g/l and preferably approximately of between 9 and 12 g/l, by adjusting the residence time in the hydrogenator, for a given concentration of anthraquinone forms.

The reduced working solution drawn from the hydrogenator is filtered at 6 to remove any trace of catalyst and then cooled at 8. It is next diluted in the mixer 9 with the additional portion of the partially oxidized working solution originating from the bypass conduit 26 and the hydrogen peroxide equivalent of which is close to zero. This additional portion of the working solution corresponds to approximately 15 to 45% by volume and preferably to approximately one third by volume of the total working solution originating from the extractor 3. This portion of oxidized working solution is therefore sent straight to the oxidizer 2 without having passed through the hydrogenator 1. The flow rate in the bypass conduit 26 is adjusted so that the working solution obtained at the outlet of the mixer 9 has a hydrogen peroxide equivalent of approximately between 7 and 9.

The working solution obtained at the outlet of the mixer 9, consisting, for example, of the mixture of approximately two-thirds of solution which has been partially reduced in the hydrogenator and of approximately one third of solution originating in oxidized form directly from the extractor 3, is next cooled in 10 to a temperature of the order of 35 to 40° C. The gas headspace pressure of the oxidizer is maintained at a value of between 2 and 4 bars. The essentially reduced working solution resulting from the mixing in 9 is thus oxidized in 2, the head fluid from the oxidizer being partially condensed in 14.

The hydrogen peroxide formed by the oxidation reaction is drawn from the base of the oxidizer in a quantity per unit volume of the oxidized working solution which is equal to the product of the hydrogen peroxide equivalent at the entry 13 of the oxidizer multiplied by the efficiency of the oxidizer. This liquid is sent directly via the conduit 16, by virtue of the propelling pressure difference, to the base of the extractor 3, which operates slightly above the atmospheric pressure. A liquid—liquid extraction is performed in the extractor by means of the demineralized water introduced at the top of the extractor.

A water-hydrogen peroxide solution is drawn from the base of the latter, its hydrogen peroxide concentration being adjusted to the value necessary for its direct use in the consumer plant 24. In the example being considered, where the plant 24 is a plant for bleaching paper pulp, the hydrogen peroxide concentration is chosen to be lower than 15% by weight, for example between 5 and 12% by weight.

The working solution separated from the hydrogen peroxide is drawn from the top of the extractor 3, having had the droplets of aqueous phase which it has entrained in the coalescer 18 removed. A portion of this solution is sent via the pump 19 to the heat exchanger 8, in which it is heated and, from there, recycled to the base of the hydrogenator 1. The other portion is sent to the mixer 9 via the bypass conduit 26.

The oxidizer 2 comprises an external enclosure containing an organized packing, or simple perforated trays or trays of the distillation tray type, that is to say each with a liquid seal, orifices for bubbling the gas rising through this seal and downcomer means for the liquid from one tray to the next, or else a combination of an organized packing and of such trays.

The organized packing, where it exists, is preferably of the so-called "intersecting corrugated" type.

Figure 2:
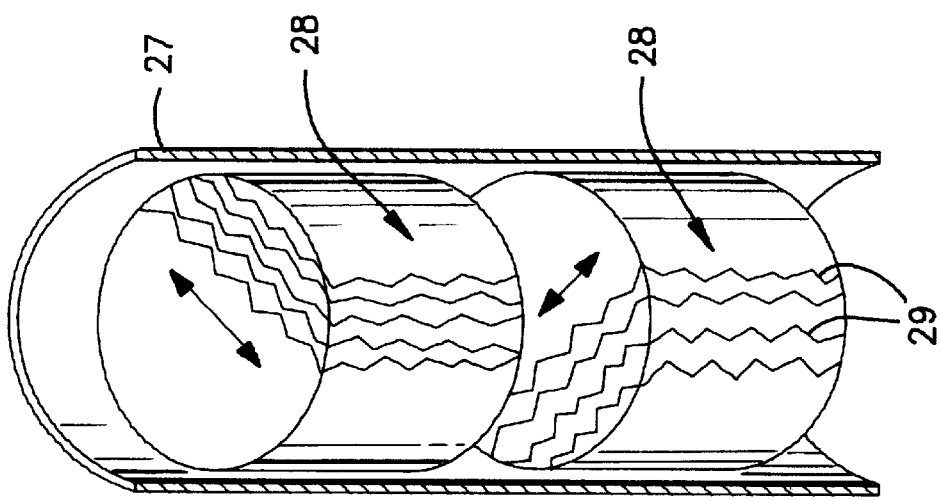
FIG. 2 shows diagrammatically in perspective the general arrangement of a part of the oxidizer, fitted with an intersecting corrugated packing.

FIG. 2 illustrates the general arrangement of the standard portion of the oxidizer containing such a packing. This standard portion includes essentially a cylindrical shell 27 in which packing elements 28 of cylindrical general shape are stacked.

Figure 3:
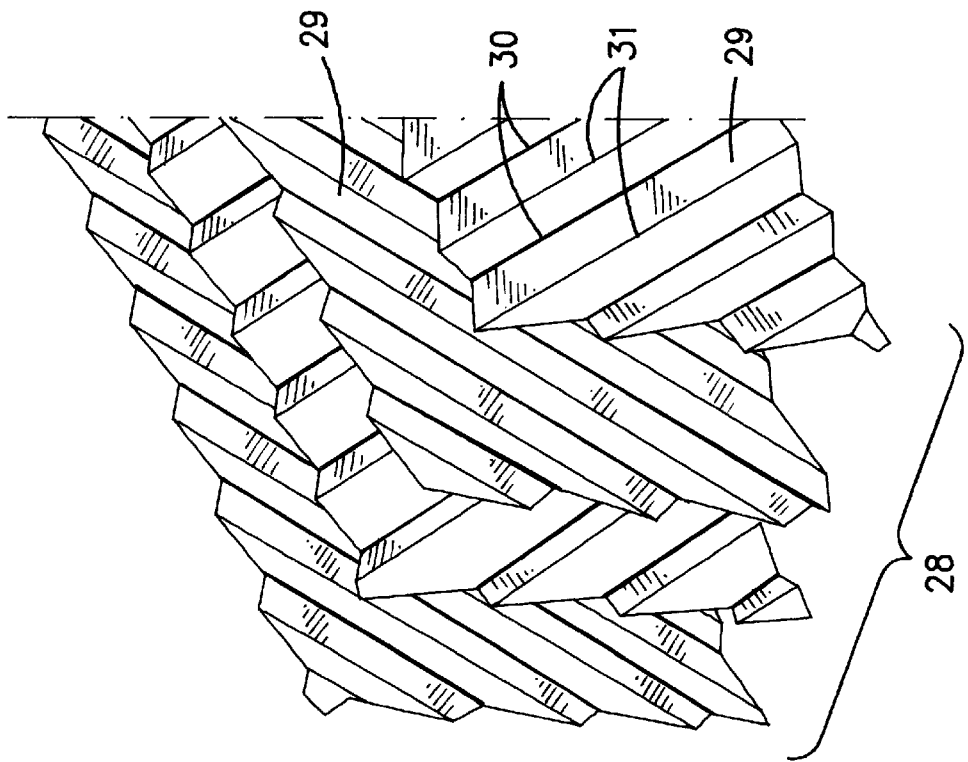
FIG. 3 shows, in exploded perspective, the constitution of an element of the packing of FIG. 2.

Each element 28, of the "intersecting corrugated" type, includes a package of lamellae 29 of rectangular general shape which are corrugated obliquely, the corrugations preferably having a triangular profile. The direction of the slope of the corrugations is reversed from one lamella to the next, as can be clearly seen in FIG. 3.

All the lamellae of a single element are placed in parallel vertical planes and have the same height. On the other hand, their length, or horizontal dimension, increases from a minimum value in the case of an outermost lamella to a maximum value in the case of the middle lamella and then decreases again to the same minimum value in the case of the other outermost lamella. Thus, when all the lamellae are pressed against one another, an element 28 of cylindrical general shape is obtained, the outline of which has been shown in FIG. 2.

On each face, each lamella comprises corrugation crests 30 and corrugation troughs 31 defining a multitude of sloping channels.

The corrugations crests of one face of a lamella touch those of the facing face of the adjacent lamella, forming a multitude of points of intersection; the latter promote the distribution and the contact between the fluids. In addition, for the same purpose, each element 28 is offset angularly by 90° in relation to the next, as can be seen in FIG. 2, and each lamella comprises a multitude of perforations, which are not shown.

The plant as described here employs a hydrogenator 1 which has a high efficiency. Given that only a portion of the working solution (approximately ⅔ by volume) is treated in the hydrogenator, the dimensions of the latter can be reduced in relation to the hydrogenators of plants in which all of the working solution is processed in the hydrogenator. Furthermore, the working solution introduced into the hydrogenator has a fairly high given concentration of anthraquinone forms, and this allows easy hydrogenation. This makes it possible to obtain a hydrogen peroxide equivalent of between 8 and 15.

As a result of the mixing performed in the mixer 9, the oxidizer 2 is fed with a working solution whose hydrogen peroxide equivalent is between 7 and 9. The relatively low value of this equivalent when compared with the values employed in known plants allows the temperature in the oxidizer to be limited without any risk of crystallization of the solution. Furthermore, the low temperature in the oxidizer results in a low partial pressure of organic vapor in the gas headspace (for example lower than 2600 pascals and preferably lower than 1300 pascals). The mixture thus contained in the oxidizer then has characteristics which are sufficiently far removed from the conditions for explosiveness.

The same advantages apply in the case of the conduit 16 and the extractor 3, in both of which the concentration of species which can form hydrogen peroxide in the presence of water, or the hydrogen peroxide concentration, is limited.

Although an "intersecting corrugated" packing as described above performs relatively poorly from the viewpoint of dividing the rising gas into fine bubbles, it is appropriate in the plant described, from the viewpoint of the gas-liquid exchange and from that of safety. In fact, since the oxidizer works in a temperature range (approximately 35 to 40° C. at the top, approximately 45 to 50° C. at the base) which is substantially lower than the usual temperature range in those plants for the production of hydrogen peroxide which operate using the technique of autooxidation of an anthraquinone derivative, the risk of explosion in the oxidizer due to contact between oxygen and solvent vapors is considerably reduced, even at the base of the oxidizer.

The essential advantage which results from the use of such an intersecting corrugated packing lies in the fact that it tends much less to retain solid impurities than the "dumped" random packings usually employed in the oxidizer.

The above comments also apply to the use of trays promoting gas-liquid contact in the oxidizer 2.

It should be noted, furthermore, that, at the same efficiency, the "intersecting corrugated" packings, like trays, take up less room than the dumped random packings, which allows the dimensions of the oxidizer to be reduced. In addition, in the case of trays, the reaction at each level of the oxidizer can be optimized by a judicious choice of the distances separating the trays.

Furthermore, another advantage contributed by the relatively low temperature of oxidation is the possibility of employing oxygen-enriched air, or even pure oxygen, in the oxidizer, in complete safety, in order to decrease the residence time of the solution in the oxidizer. In fact, when the residence time is shorter, the dimensions of the unit can be reduced further, and the quantity of decomposed products of the working solution is lowered.

The plant described here employs a bypass of the recycle conduit for diluting the reduced working solution originating from the hydrogenator. It is also possible to employ any other appropriate device.

I claim:

1. In a plant for the production of hydrogen peroxide using the technique of autooxidation of an anthraquinone derivative, the plant including a catalytic hydrogenator fed with hydrogen, an oxidizer fed with a fluid containing oxygen, an extractor fed with water, and means for passing a working solution containing at least one anthraquinone derivative in solution in at least one organic solvent, successively into the hydrogenator, into the oxidizer and into the extractor, and then recycling it to the hydrogenator, the improvement wherein means are provided for diluting the working solution originating from the hydrogenator, said means for diluting comprising means for bypassing toward the oxidizer a portion of the working solution originating from the extractor without said portion passing through the hydrogenator.

2. Production plant according to claim 1, wherein the means for bypassing are structured and arranged to bypass to the oxidizer between 15% and 45% by volume of the working solution originating from the extractor.

3. Production plant according to claim 1, wherein the means for bypassing are structured and arranged to bypass to the oxidizer one third by volume of the working solution originating from the extractor.

4. Production plant according to claim 1, wherein the hydrogenator is structured and arranged to produce at its outlet a working solution having a hydrogen peroxide equivalent of between 8 and 15.

5. Production plant according to claim 4, wherein the hydrogen peroxide equivalent at the outlet of the hydrogenator is between 9 and 12.

6. Production plant according to claim 1, wherein the means for diluting include means for mixing reduced working solution originating from the hydrogenator and oxidized working solution originating directly from the extractor, and means for directing the mixture thus formed to the oxidizer.

7. Production plant according to claim 6, wherein the means for bypassing and the means for mixing are structured and arranged to obtain at the entry of the oxidizer a working solution which has a hydrogen peroxide equivalent of between 7 and 9.

8. Production plant according to claim 1, wherein the means for bypassing comprise a bypass conduit placed between a recycling conduit for recycling oxidized working solution, which links an outlet of the extractor to an entry of the hydrogenator, and a feed conduit for feeding the oxidizer with working solution, which links an outlet of the hydrogenator to an entry of the oxidizer.

9. Production plant according to claim 8, further comprising a heat exchanger between the recycling conduit and the feed conduit, said bypass conduit being linked to the recycling conduit upstream of the heat exchanger, and to the feed conduit downstream of the heat exchanger.

10. Production plant according to claim 1, wherein the oxidizer comprises an enclosure containing gas-liquid contact means.

11. Production plant according to claim 10, wherein the gas-liquid contact means comprise perforated trays.

12. Production plant according to claim 10, wherein the gas-liquid contact means comprise intersecting corrugated packing.

* * * * *